United States Patent Office 3,372,214
Patented Mar. 5, 1968

3,372,214
METHOD OF DIELECTRICALLY HEAT-
MOLDING EPOXY RESINS
Stephen D. Marcey, Dayton, Ohio, assignor to The National Cash Register Company, Dayton, Ohio, a corporation of Maryland
No Drawing. Continuation of application Ser. No. 284,004, May 29, 1963. This application Mar. 20, 1967, Ser. No. 624,628
2 Claims. (Cl. 264—25)

ABSTRACT OF THE DISCLOSURE

A method of molding and curing a composition of an epoxy resin and a polar epoxy resin curing agent in which the composition is uniformly dielectrically preheated to a temperature within 50° F. of the post-curing temperature within a period of from about 4 to about 60 seconds and poured into a mold which has also been preheated to the post-curing temperature. The filled mold is maintained at the post-curing temperature for a period of from about 5 to about 45 minutes to gel the composition. The gelled composition is removed from the mold and post cured for a period of from about 30 to about 60 minutes to completely cure the composition. The post-curing temperature can range, for example, from about 150° to about 200° F.

This application is a continuation of application Ser. No. 284,004 filed May 29, 1963 now abandoned.

The present invention relates to a method for molding and curing epoxy resin compositions; more particularly it relates to a method of utilizing dielectric heating means, whereby the time required for potting and curing electrical components with liquid-epoxy resins as well as the number of molds required per casting is substantially reduced compared to the time and number of molds required with conventional methods, without the loss of desirable characteristics in the fully cured casting. As used herein, the term casting is meant to include or be interchangeable with potting and encapsulation as the terms are understood and used in the art of resin molding, particularly epoxy resin molding.

The advantages and disadvantages of using epoxy resins for industrial potting of sensitive elements such as electrical components are, in general, well known, as shown, for example, in "Epoxy Resins," by Lee-Neville, 1957, published by McGraw-Hill Book Company, New York, N.Y., United States of America.

Typical advantages realized by the use of epoxy resins are that castings produced therewith provide the potted or encapsulated element with a high degree of protection against moisture, contamination, and mechanical abuse; other advantages associated with epoxy castings are high adhesion and low volume shrinkage and, by the careful selection of epoxy formulations, high heat distortion, tensile strength, compressive strength, and excellent electrical characteristics such as high volume resistivity and arc resistance. Cured epoxy resins are also well known for their excellent resistance to acids, bases, solvents, and corrosive fumes and the like. In order to be useful as a unit in an integrated apparatus, it is often desirable that potted electrical or electronic components have very accurate dimensions. To impart such accurate dimensions to epoxy resin castings normally necessitates the use of accurately-machined steel molds. Even though recently-developed mold-making materials such as epoxy laminates, silicone polymers, vinyl plastisols, and low temperature melting alloys are cheaper, they seldom satisfy the requirements of dimensional accuracy, mold life, and heat transfer properties.

In the prior methods of potting various components, conventional casting and potting liquid epoxy resin compositions, particularly those containing an aliphatic amine hardener, are first poured into a machined mold containing one or more components to be encapsulated, the mold being filled while both the resin and the mold are at room temperature, and the thus-filled mold then is placed in an oven until the resin is fully cured at a temperature and time of about 150 degrees Fahrenheit to 200 degrees Fahrenheit for at least two hours, respectively.

Certain other epoxy resin formulations may be heated to 250 degrees Fahrenheit to 300 degrees Fahrenheit and added to molds at the same temperature and still require cures of several hours at temperatures ranging from 300 degrees Fahrenheit to as high as 400 degrees Fahrenheit. Generally, such formulations contain anhydrides as curing agents which may also contain catalysts. Epoxy resin-anhydride compositions of this type cannot be used in a short gel time (thirty minutes or less) system; they are also unsuitable for encapsulating delicate components that may be affected by high curing temperatures.

According to the present invention, a selected liquid epoxy resin composition is first rapidly pre-heated by dielectric means preferably to a temperature within plus or minus fifty degree Fahrenheit of the post-curing temperature; second, said resin is poured into a mold preheated to the post-curing temperature; third, the resin filled mold is maintained at said curing temperature for a time sufficient to gel the epoxy resin composition to a self-sustaining rigid state; and, fourth, the gelled composition is removed from the mold and post-cured at post-curing temperature for a time sufficient to fully set the casting.

In the conventional method of epoxy resin casting, the molded part is held in the steel mold for the entire molding cycle, including the time required to harden the resin through the gel stage as well as the post-curing stage. Thus, the conventional process is obviously inefficient in mold utilization and necessarily results in high cost per potted part because the casting remains in the mold for an excessive time and also because of the inherently high cost of specially-designed steel molds. By comparison, the novel process of the invention more than doubles the output per mold because of advantages obtained by using the following steps and materials:

(1) Starting the potting cycle with a pre-heated epoxy-hardener mixture, (2) using an epoxy-hardener mixture the temperature of which is susceptible of being raised from room temperature within fifty degrees Fahrenheit of the selected curing temperature by dielectric heating means within one minute, and preferably within thirty seconds, of heating time, (3) the utilization of epoxy formulations which gel to a self-sustaining state, in a uniform manner, within an interval ranging from about five minutes to forty-five minutes, when the pre-heated formulation is added to a mold at post-curing temperatures, and (4) post-curing the gelled casting after it has been removed from the mold.

The improved novel process significantly reduces the cost of making accurately dimensioned epoxy resin castings by providing means and materials which result in a short gelling cycle and yet produce a self-sustaining epoxy resin casting suitable for post-curing after removal from the mold. In combination, said means and materials allow expensive molds utilized in the process to be re-used on a shorter time cycle. In the process of the invention, when a casting has gelled to a self-supporting or self-sustaining state, which requires, preferably, approximately thirty minutes of heating time at post-curing temperature, it is removed from the mold for post-curing, and the mold is thus freed for making a new casting. In contrast, castings made by the prior-art process cannot be removed from the mold until the casting is fully cured. Thus, the mold is not released for re-use until the casting has been fully cured in the post-curing operation, which, on the average, requires at least two hours at moderate curing temperatures.

It is thus an object of the invention to provide a process for making epoxy resin castings wherein the processing conditions and materials are selected so as to result in a self-supporting gelled article which is advantageously post-cured after removal from the mold. Post-curing the casting outside the mold releases the latter for re-use and permits the output per mold to be more than doubled compared to the output obtained with prior methods.

Another object is to provide a process for molding and curing epoxy resin castings and epoxy resin potted or encapsulated elements in which the resin composition is such that it may be pre-heated by dielectric means from room temperature to a temperature at least approaching the post-curing temperature in a short time interval, said temperature elevation being accomplished by said means preferably within forty-five seconds.

It is also an object of the invention to provide a process for molding and curing epoxy resin compositions which are characterized by low exotherms when quickly heated to post-curing temperatures by dielectric heating means as well as when held at such temperatures after the preliminary dielectric heating step. The epoxy compositions employed in the process must exhibit sufficient pot-life to be readily pourable within at least thirty minutes after pre-heating, and, further, they must provide a self-supporting gelled casting within a preferred time interval ranging from fifteen to thirty minutes when held at post-curing temperatures.

Yet another object of the invention is to provide a process for molding and curing a liquid epoxy resin composition having a high dielectric constant and a high loss factor as evidenced by a rapid and large temperature increase when the composition is subjected to the effect of an alternating dielectric field. The composition employed in the process must have sufficient pot-life at post-curing temperatures to allow adequate time for potting, encapsulation, and similar applications and yet be susceptible to curing at moderate curing temperature for moderate heating times; i.e., such as 150 degrees Fahrenheit to 200 degrees Fahrenheit for thirty to sixty minutes, respectively.

The epoxy resin compositions disclosed below are especially suited for encapsulating heat-sensitive electronic and electrical components, and are further particularly suitable for use in the instant process, since they may readily be heated to require curing temperatures by brief exposure between the plates of a dielectric heating apparatus.

Generally, epoxy compositions with adequate pot-lives at curing temperatures (150 degrees Fahrenheit to 200 degrees Fahrenheit) must be cured for excessively long periods of time, or, alternatively, they must be cured at even higher temperatures for shorter periods. Although such formulations are available in commerce, they are not generally suitable for potting heat-sensitive elements.

An important aspect of the invention is the use of dielectric heating means as the source of energy for pre-heating the resin sample. Dielectric heating apparatus is well known, and a number of types are available in commerce. Generally, such apparatus operates from a 120-volt or a 230-volt, 60-cycle power source and is equipped with power output controls and two electrodes (metal plates) across which a sample to be heated is subjected to an alternating electrical field at a high voltage and frequency (15,000 volts at one megacycle and up). The alternating field greatly accelerates molecular motion in the sample, and thereby a large amount of heat is rapidly and uniformly generated throughout the sample mass within the sphere of influence of the applied alternating field. From this standpoint, dielectric heating is significantly different from other heat sources because it does not depend on an external heat source to transfer heat by conduction, convection, or radiation to the surface of the material to be heated and then to the interior of said material by conduction or otherwise, so that the resin mass as a whole is uniformly and homogeneously heated to a higher temperature in a very short time.

One type of apparatus which proved efficient and convenient for pre-heating resin samples of about 50 grams is sold under the designation Thermall by W. T. LaRose and Associates, Incorporated, Troy, N.Y., United States of America.

In the practice of the invention, any of a large number of epoxy resin-curing agent compositions may be used. Epoxy resins suitable for use in the present invention are any of the epoxy resins customarily employed in conventional potting and encapsulating applications. In general, such resins are liquid and have low to medium molecular weight, having an epoxy equivalent to about 170 to 250. Well-known resins of the foregoing type are liquid epoxy resins sold under such trademarks as Epon, Araldite, Bakelite, and others. Thus, the epoxy resin component useful in the resing-curing agent compositions of the invention are well-known resins conventionally used in the casting and potting art. Curing agents suitable for use with such conventional potting epoxy resins are also known in the art and are available in commerce. Although, as will appear below, certain resin-curing agent combinations provide castings with superior characteristics, curing agents of a polar nature or agents which in combination with the resin provide a high dielectric constant composition will provide materials suitable for dielectric heating according to the process of the invention.

In some instances, casting resin diluents and/or filler may be added to the resin composition without materially affecting the quality in the final product. However, such additions are normally limited to minor amounts, since it is known that such materials tend to degrade certain physical properties of cured epoxies as the amount incorporated in the resin is increased.

The following examples will serve to further illustrate and describe the invention without, however, limiting its scope. In these examples, only preferred embodiments of resin compositions are set forth; however, for some applications, other materials in the same or different proportions may also be used to provide satisfactory castings. In the following, the proportions are given as parts by weight.

*Example 1*

A mixture of 100 parts of Epon 815, 20 parts of Araldite 956, and 20 parts of HG0–55 is mixed at room temperature to form a homogeneous blend.

Epon 815 is the trademark designation of a liquid, low-viscosity epichlorohydrin-bisphenol A epoxy resin having an epoxide equivalent of 175 to 195 and a kinematic viscosity at 25 degrees centigrade of 5 to 7 poises.

Araldite 956 is the trademark designation of an aliphatic amine hardener having a viscosity of 500 cps. at 25 degrees centigrade, a specific gravity of 1.05 at 23 degrees centigrade, and a flash point (Cleveland Open Cup) of 177 degrees centigrade.

HG0–55 is the trade designation of a hydrous magnesium silicate with maximum particle size of 12 microns.

30 grams of the mixture is weighed in a paper cup (one and three-eighths inches or less in height); the cup is placed in the center of the bottom plate of the dielectric heater, and the upper plate is lowered into position over the cup; the resin is then subjected to a high-frequency electrical field for fifteen seconds; the resin sample, now at a temperature of 115 degrees Fahrenheit, is removed from the heating apparatus and poured into a mold (an arc suppressor to be encapsulated held in the mold) which has been pre-heated to a temperature of 150 degrees Fahrenheit; the resin-filled mold is placed in a constant-temperature oven set for 150 degrees Fahrenheit until the resin gels to a self-supporting state, which required twenty minutes with the composition of this example; and, after gelling, the resin casting is removed from the mold and post-cured for one hour at 150 degrees Fahrenheit.

The casting of this example was free of bubbles, had negligible shrinkage, and exhibited high heat distortion and compressive strength.

*Example 2*

A mixture of 100 parts of Epon 815 and 50 parts of ZL308 (recently redesignated EM308) is prepared, and a 30-gram sample is pre-heated, gelled in the mold, and post-cured exactly as in Example 1. This composition gelled in the mold at 150 degrees Fahrenheit in thirty minutes. After post-curing at 150 degrees Fahrenheit for one hour, the casting was clear and transparent, with little or no shrinkage, and had excellent strength and configuration. Epon 815 is described in Example 1. ZL308 is a fatty acid low-molecular-weight polymer sold by Thiokol Chemical Corporation. The polymer has a viscosity of 2 to 3 poises at 80 degrees Fahrenheit, a pH of 11.8, a refractive index of $1.4998 \, N_D^{25}$, and a specific gravity of 0.95 at 25 degrees centigrade.

*Example 3*

A mixture of 100 parts of Epon 815 and 13 parts of Curing Agent D is prepared by mixing the ingredients at room temperature. Epon 815 is described in Example 1. Curing Agent D is a tertiary amine salt curing agent sold by Shell Chemical Corporation. This curing agent is the tri-2-ethyl hexoate salt of DMP–30, which, chemically, is tridimethyl amino methyl phenol. 30 grams of the mixture of this example is treated according to the method of Example 1, except that the dielectric heating time was 30 seconds, the gel time was 20 minutes at 200 degrees Fahrenheit, and the post-curing temperature was also 200 degrees Fahrenheit. The casting so produced was of the same high quality as those described in previous examples.

*Example 4*

A mixture of 100 parts of Epon 826 and 13 parts of Curing Agent D was prepared. 30 grams of this mixture was used to encapsulate an electrical element in the manner and under the conditions shown in Example 3. The resulting product had excellent epoxy resin casting properties.

Curing Agent D is described in Example 3 above. Epon 826 is the trademark designation of a liquid condensation product of bisphenol A and epichlorohydrin having an epoxide equivalent of 175 to 190 and a kinematic viscosity of 50 to 100 poises at 25 degrees centigrade.

*Example 5*

In this example, 75 parts of Epon 826, which is described in Example 4, is mixed with 25 parts of Versamid 140. The latter is the trademark designation of a liquid polyamide condensation product of a polyamine and a polycarboxylic acid, said product having a viscosity of 125 to 175 poises at 25 degrees centigrade and an amine value of 350 to 400. A casting was prepared with the composition of this example according to the procedure set forth in Example 1, except that the composition was heated in the dielectric heater for twenty seconds, gelled in the mold for fifteen minutes at 185 degrees Fahrenheit, and post-cured for one hour at 185 degrees Fahrenheit. The resulting product was a light amber transparent casting having excellent physical characteristics.

*Example 6*

A mixture of 70 parts of Epon 815, 30 parts of Versamid 140, and 5 parts of glycol-di-mercaptoacetate (ethylene-bis-thioglycolate), as a cure accelerator, was prepared by blending the materials at room temperature. Epon 815 is described in Example 1, and Versamid 140 is described in Example 5 above. Electrical elements potted with 30 grams of composition of this example were amber in color, transparent, and of excellent physical characteristics. The process of Example 1 was followed in making the casting and with similar results, except that the dielectric heating time was ten seconds.

*Example 7*

A mixture of 100 parts of Oxiron 2000, 50 parts of HET anhydride, and 10 parts of glycerin was prepared by simply mixing the ingredients at room temperature. Oxiron 2000 is the trade name designation of a resin sold by Food Machinery and Chemical Corporation, New York, N.Y., United States of America. This resin is a liquid epoxy resin having an epoxy equivalent of 177, a hydroxyl content of about 2.5%, an iodine value of about 185, and a viscosity of about 1800 poises at 25 degrees centigrade, each resin repeating unit containing at least one each of the following groups: —OH, RCOO—, 1,2-epoxy,

and $CH_2$=SH—. HET anhydride is the trademark designation of 1,4,5,6,7,7-hexachlorobicyclo-[2·2·1]-5-heptene-2,3-dicarboxylic anhydride, which is also known as chlorendic anhydride. 30 grams of this composition is treated as in Example 1 and with comparable results, except that the resin was dielectrically heated for five seconds and had an in-the-mold gel time of twelve minutes at 150 degrees Fahrenheit.

The above examples are merely illustrative of the preferred embodiments. Suitable castings may also be prepared under conditions varying more or less widely from those set forth in the specific examples. The following table describes the ranges, acceptable and preferred, over which the designated parameters may be varied:

| Variable | Acceptable Range | Preferred Range |
|---|---|---|
| Dielectric Heating Time. | 4 to 60 seconds | 5 to 45 seconds. |
| Pot-Life | 2 minutes to 2 hours plus. | 5 to 30 minutes. |
| Gel Time (in the mold at curing temperatures). | 5 to 45 minutes | 15 to 30 minutes. |
| Post-curing (time and temperature). | 30 to 60 minutes at 150 to 200 degrees Fahrenheit. | 30 to 60 minutes at 150 to 200 degrees Fahrenheit. |

From the foregoing disclosure, it will be obvious to those skilled in the art that the process of the invention provides excellent castings not only with the epoxy resins and resin compositions specified, but also with any epoxy composition in which the dielectric heating time, pot-life, and gel time fall within the acceptable range in the above table. The property of a composition to post-cure within the acceptable range of time and temperature, although not so critical as the other mentioned variables, is also an essential of epoxy formulations suitable for use in the novel process of the invention.

What is claimed is:

1. In a method utilizing dielectric heating means for molding and curing an epoxy resin molding composition, wherein the in-the-mold heating time is substantially less than the heating time required with conventional in-the-mold oven curing, the improvement which comprises:
   (a) Uniformly dielectrically pre-heating an epoxy resin composition consisting essentially of an epoxy resin, normally liquid at room temperature, and a polar epoxy resin curing agent from room temperature to a temperature within 50 degree Fahrenheit of the post-curing temperature within a period of from about 4 seconds to about 60 seconds, (b) Pre-heating a mold to the post-curing temperature, (c) Pouring the pre-heated composition into the pre-heated mold, (d) Maintaining said filled mold at the post-curing temperature for a period of from about 5 minutes to about 45 minutes to gel the composition, (e) Removing the gelled composition from the mold, and (f) Post-curing the gelled composition at its post-curing temperature for a period of from about 30 minutes to about 60 minutes to completely cure the composition.

2. The process of claim 1 wherein the post-curing temperature ranges from about 150 degrees to about 200 degrees Fahrenheit.

References Cited

UNITED STATES PATENTS

| 2,448,676 | 9/1948 | MacMillian | 264—26 |
| 2,935,488 | 5/1960 | Phillips | 260—830 |

FOREIGN PATENTS 611,422  10/1948  Great Britain.

OTHER REFERENCES

Modern Plastics, June 1944, pp. 116, 117, 118, 166 and 168 relied upon.

ROBERT F. WHITE, *Primary Examiner.*

R. B. MOFFITT, R. R. KUCIA, *Assistant Examiners.*

UNITED STATES PATENT OFFICE
CERTIFICATE OF CORRECTION

Patent No. 3,372,214                            March 5, 1968

Stephen D. Marcey

It is certified that error appears in the above identified patent and that said Letters Patent are hereby corrected as shown below:

Column 4, line 26, "to" should read -- of --. Column 6, line 31, "SH" should read -- CH --.

Signed and sealed this 23rd day of September 1969.

(SEAL)
Attest:

Edward M. Fletcher, Jr.                    WILLIAM E. SCHUYLER, JR.
Attesting Officer                             Commissioner of Patents